United States Patent [19]

Kuwayama et al.

[11] 4,315,279
[45] Feb. 9, 1982

[54] COLOR IMAGE DETECTING DEVICE

[75] Inventors: Tetsuro Kuwayama, Yokohama; Kazuo Tanaka, Tokyo, both of Japan

[73] Assignee: Canon Kabushiki Kaisha, Tokyo, Japan

[21] Appl. No.: 184,753

[22] Filed: Sep. 8, 1980

[30] Foreign Application Priority Data

Sep. 13, 1979 [JP] Japan .............................. 54-117784

[51] Int. Cl.³ ............................................. H04N 9/07
[52] U.S. Cl. ................................................. 358/44
[58] Field of Search ........................... 358/44, 46–48, 358/55; 313/371

[56] References Cited

U.S. PATENT DOCUMENTS 3,984,721 10/1976 Sato et al. ....................... 358/46

Primary Examiner—John C. Martin

Attorney, Agent, or Firm—Fitzpatrick, Cella, Harper & Scinto

[57] ABSTRACT

A color image detecting device comprising a photodetector having a plurality of image element areas arranged one-dimensionally or two-dimensionally, an imaging optical system for forming an object image on the light-receiving surface of the photodetector, and a color filter disposed at a finite distance in front of said light-receiving surface and having a number of filter elements each having a spectrum transmissivity for obtaining a color signal, the filter elements being arranged substantially correspondingly to the image element areas, wherein, in order to correspond the filter elements of the color filter to the image element areas, the filter elements are successively deviated relative to the image element areas as the angle of incidence of the light beam incident on each of the image element areas is varied by the position of each of the image element areas from the optical axis of the imaging optical system.

5 Claims, 7 Drawing Figures

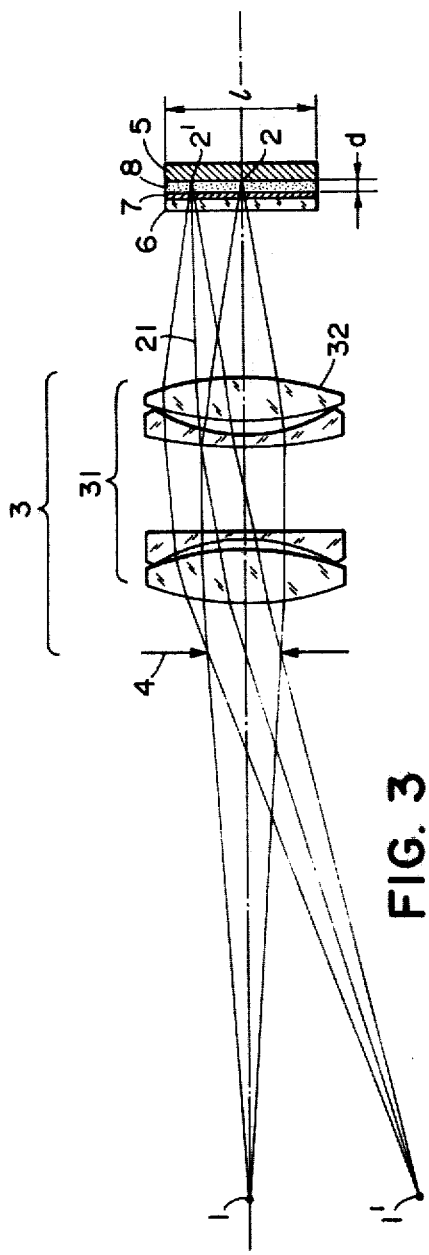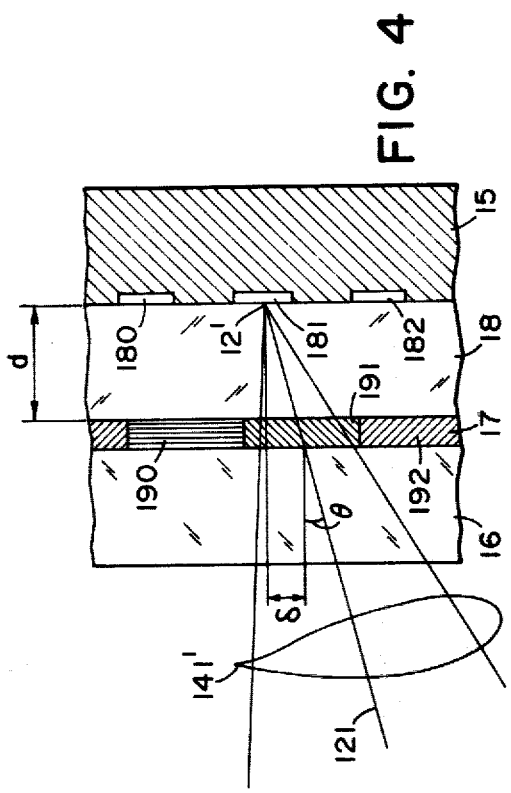

COLOR IMAGE DETECTING DEVICE

BACKGROUND OF THE INVENTION

1. Field of the Invention

The present invention relates to a color image detecting device for detecting color images and converting the same into electrical signals or the like. More particularly, it relates to improvements in a color image detecting device such as a CCD image pick-up device or the like, which comprises a color filter disposed in front of a photodetector having a surface comprising a number of regularly divided and arranged image element areas.

2. Description of the Prior Art

Reference is first made to FIG. 1 of the accompanying drawings to describe a conventional color image detecting device. In the ensuing description, for convenience of illustration, an example is presented in which a one-dimensional photodetector having image element areas arranged in one direction is used as the photodetector. It will be understood, however, that a two-dimensionally arranged photodetector or image pick-up tube can also be used according to the principles set forth herein.

In FIG. 1, an imaging optical system 3 serves to keep an object and the detecting surface of a detector 5 in a conjugate relation, and a point 1 of the object on the optical axis and a point 1' of the object off the optical axis are respectively imaged at different points 2 and 2' on the photodetecting surface. As shown in FIG. 2A of the accompanying drawings, just in front of the photodetector 5 having divided image element areas 50, 51, 52, ... regularly arranged, there is disposed a color filter 7 having a number of filter elements 70, 71, 72, ... arranged on a transparent substrate 6. Between the color filter 7 and the detecting surface of the photodetector 5, an adhesive layer 8 having a thickness d and a refractive index n is interposed to secure the two surfaces against relative movement therebetween.

In FIG. 2A, the light beam 41 from the point 1 (FIG. 1) of the object on the optical axis passes, for example, through a green color filter element 71 and forms a point image 2 on the image element area 51 of the photodetector 5 on the optical axis, and is converted into an electrical signal. The filter elements 70, 71, 72, ... of the color filter 7 such as red, green, blue, etc. which have different transmitting characteristics and the image element areas 50, 51, 52, ... of the photodetector are arranged so as to be opposed to each other at an equal pitch. In such a color image detecting device, correct color information is detected from the image of an object on or near the optical axis, as shown in FIG. 2A. However, as regards the points of an object off the optical axis, correct color information cannot be obtained, as shown in FIG. 2B. Such tendency becomes more pronounced as the object departs more from the optical axis. That is, the light beam 41' from the off-axial point 1' passes through a color filter element 91 and forms a point image 2' in the image element area 81 on the photodetector 5, but since the principal ray 21 is inclined with respect to the photodetecting surface, part 22 of the marginal rays of the light beam 41' does not pass through the color filter element 91 through which it should pass, but instead passes through an adjacent color filter element 92 to the image element area 81 and thus, the detected signal is an incorrect signal having two types of color information mixed together. Thus, in prior art conventional color image detecting devices, each of the elements of the color filter and each of the image element areas of the photodetector have been arranged at an equal pitch in opposed relationship with each other and this has led to the disadvantage that in the circumferential portion of the image, correct color information often cannot be detected.

As a solution to the above-noted disadvantage peculiar to conventional devices, it might occur to one to employ as the imaging optical system of FIG. 1 an optical system in which, even for the image off the optical axis, as shown in FIG. 3, the principal ray is incident perpendicularly to the imaging plane, namely, a so-called telecentric optical system whose exit pupil position lies at infinity. In a telecentric optical system, a diaphragm 4 must be placed on the forward focal plane of a lens system 31 which lies rearwardly of the diaphragm and therefore, it is difficult to reduce the full length of the imaging optical system while maintaining good performance. In addition, in order that the light beam leading this telecentric imaging optical system may cover the entire photodetecting surface, the diameter of its last lens surface 32 must be greater than the maximum dimension 1 of the photodetecting surface, and this undesirably leads to bulkiness of the imaging optical system itself. To make the imaging optical system compact without employing such a telecentric optical system, there are methods of bringing the color filter 7 and the photodetector into extremely intimate contact with each other. A first one of such methods is to make the thickness d of the adhesive layer 8 extremely thin. However, it is very difficult to render the thickness of the adhesive layer to several $\mu m$ or less, and it is also difficult to obtain a material compatible with the durability of the adhesive layer. A second method is to form a color filter layer directly on the photodetector. However, this method has the disadvantage that the manufacturing yields of the photodetector and color filter are considerably low and accordingly, the resultant device is very costly.

SUMMARY OF THE INVENTION

It is an object of the present invention to provide a color image detecting device which correctly detects color information by a simple constructions as compared with the above-described methods.

In the color image detecting device according to the present invention, the interval between the filter elements of a color filter disposed at a finite distance in front of a photodetector having regularly arranged image elements is made to differ from the division interval of the image element areas of the photodetector, thereby achieving the above object.

That is, in the color image detecting device according to the present invention, the filter elements corresponding to the image element areas of the photodetector are successively relatively deviated in position with the variation in angle of incidence of the principal ray of the light beam incident on each of the image element areas.

The invention will become more fully apparent from the following detailed description thereof taken in conjunction with the accompanying drawings.

BRIEF DESCRIPTION OF THE DRAWINGS

FIG. 3 shows an example which employs a telecentric optical system in a color image detecting device.

FIG. 4 shows an embodiment of a color image detecting device according to the present invention.

DESCRIPTION OF THE PREFERRED EMBODIMENTS

Figure 1:
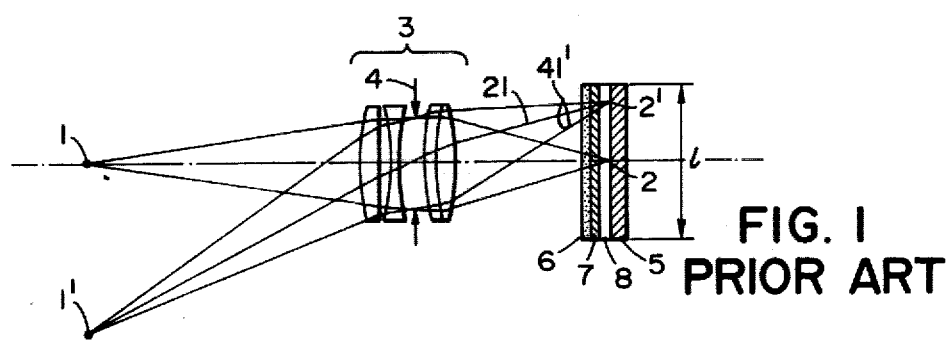
FIG. 1 shows a color image detecting device according to the prior art.
Figure 2A:
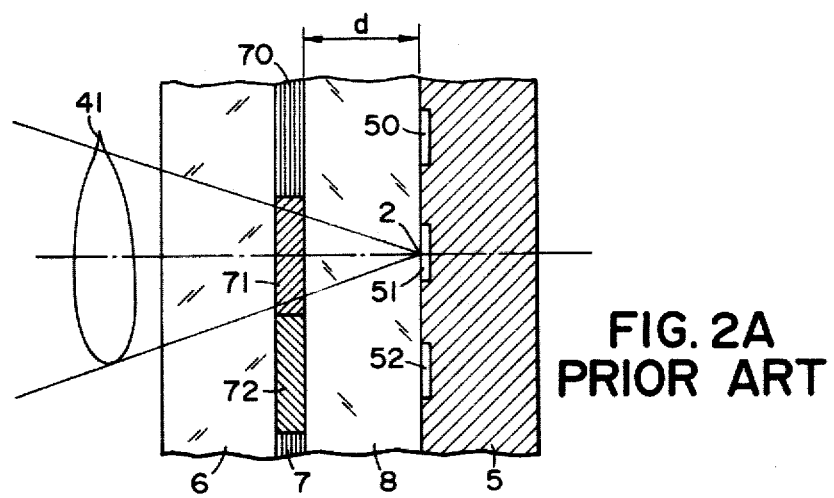
FIGS. 2A and 2B enlargedly show the neighborhood of the point images on and off the optical axis in the device according to the prior art.
Figure 2B:
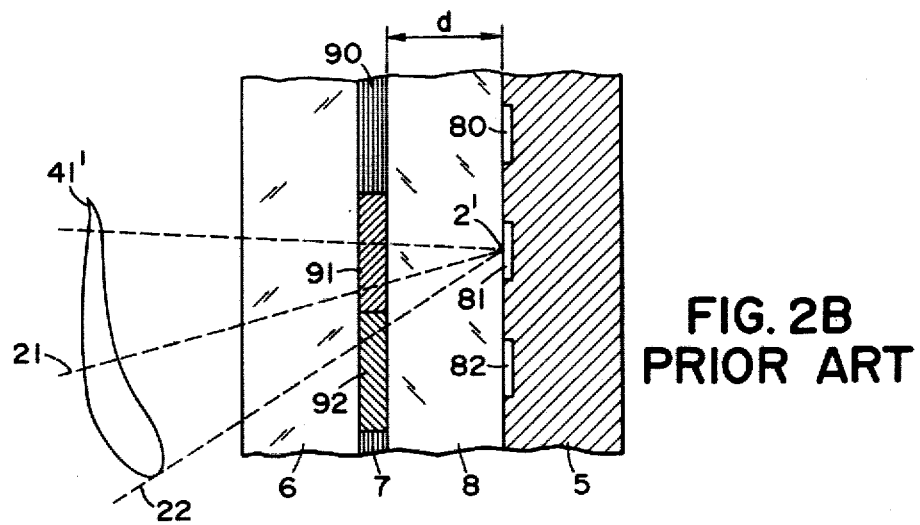

An embodiment of the present invention will be described with reference to FIG. 4. In FIG. 4, the object point of an object off the optical axis is imaged on a photodetector 15 through an imaging lens system to form an image 12'. A color filter 17 formed on a transparent substrate 16 is disposed just in front of the photodetector 15, and the color filter 17 and the photodetector 15 are bonded to each other by means of an adhesive layer 18 having a thickness d and a refractive index n. The principal ray 121 of the light beam 141' forming the image 12' is shown in this view to be incident on the photodetecting surface at a predetermined angle θ with respect to the direction perpendicular to the photodetecting surface.

The color filter 17 and the photodetector 15 are arranged at such a pitch that color filter elements 190, 191, 192, ... and image element areas 180, 181, 182, ... are successively laterally deviated relative to one another by a minute amount.

In FIG. 4, the light beam 141' from an off-axial point is such that the principal ray 121 enters an image element area 181 at an angle of incidence θ. The filter element 191 corresponding to the image element area 181 is disposed at a position displaced relative to the image element area 181 by a minute amount δ and therefore, almost all of the marginal rays of the light beam 141' also pass through the same filter element 191 and are condensed at the image element area 181. The relative displacement amount δ is determined preferably so that the principal ray 121 passes through the color filter element 191 and the center of the image element area 181, that is, the quantity of light passing through the filter elements other than the color filter element 191 to the image element areas becomes minimum.

Now, let y be the distance of a particular image element area from the optical axis, d be the thickness of the adhesive layer, n be the refractive index of the adhesive, and L be the distance of the exit pupil of the imaging optical system from the image plane (the light-receiving surface). Then, the approximate preferred lateral deviation amount δ is given by the following formula.

$$\delta \approx (y/L) \times (d/n) = (dy/nL) \quad (1)$$

Figure 5:
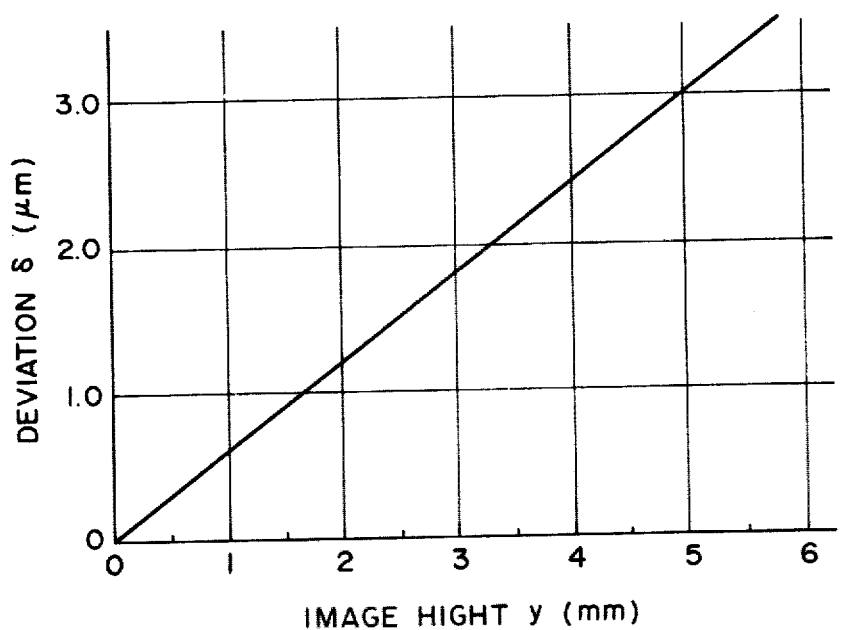
FIG. 5 is a graph showing the relation between the deviation amount δ and the image height y of a color filter element and a photodetecting image element arranged according to the principles of the present invention.

From the result of formula (1), the lateral deviation amount δ is proportional to y and therefore, the arrangement interval between the color filter elements may simply be set at a pitch shorter than the division interval between the image element areas of the photodetecting portion by a suitable amount. As a specific example, where l = 11 mm, d = 30 μm, the thickness of the glass substrate 16 is 1.5 mm, the refractive indices of the glass and the adhesive are 1.5 and the exit pupil position L = 33 mm (conversion in the air), the comparison between the most preferable lateral deviation amount δ strictly calculated for the image height y from the optical axis and the result of formula (1) is shown in Table 1, and the relation between δ and y is shown in FIG. 5.

TABLE 1

| Image height | Deviation δ(μm) | |
|---|---|---|
| y(mm) | Approximate value | Strict value |
| 0.5 | 0.30 | 0.30 |
| 1.0 | 0.61 | 0.61 |
| 1.5 | 0.91 | 0.91 |
| 2.0 | 1.21 | 1.21 |
| 2.5 | 1.52 | 1.51 |
| 3.0 | 1.82 | 1.81 |
| 3.5 | 2.12 | 2.11 |
| 4.0 | 2.42 | 2.41 |
| 4.5 | 2.73 | 2.71 |
| 5.0 | 3.03 | 3.01 |
| 5.5 | 3.33 | 3.31 |

As is apparent from this result, the difference between the approximate value and the strict value is maximum 0.02 μm and this is an almost negligible amount. Therefore, generally, if the maximum width of the photodetector is l, the ratio of the filter element pitch to the image element area pitch is expressed as $$\gamma = \frac{l/2 - \delta_0}{l/2} = 1 - \frac{d}{nL},$$

where $\delta_0$ is δ when $y = l/2$.

From the design result of color image reading lenses heretofore used, it is known that an imaging lens of high performance can be designed if the distance of the exit pupil of the imaging optical system from the image plane (the light-receiving surface) has a degree of freedom between 1.5 times to 50 times the maximum dimension l of the picture plane. With L = 1.5 l as the nearest pupil position, the lateral deviation amount $\delta_1$ with respect to the endmost photodetection image element area is $$\delta_1 = d/3n \quad (2)$$

and in this case the value $\delta_1$ of the ratio of the color filter element arrangement interval to the photodetector image element area arrangement interval is given by the following equation:

$$\gamma_1 = \frac{l/2 - \delta_1}{l/2} = 1 - \frac{d}{1.5nl} \quad (3)$$

Likewise, where L = 50 l, $$\delta_2 = \frac{d}{100n} \quad (4)$$

$$\gamma_2 = \frac{l/2 - \delta_2}{l/2} = 1 - \frac{d}{50nl} \quad (5)$$

Accordingly, the value Y of the ratio of the filter arrangement interval to the photodetector division interval may take the range given by the following formula:

$$1 - d/1.5nl \leq Y \leq 1 - d/50nl \quad (6)$$

As shown above, if the thickness d of the adhesive layer can be made constant, the degree of freedom with respect to the pupil position of the imaging lens will be increased by merely setting the color filter element arrangement interval to a small value at a predetermined ratio to the photodetector image element area division interval and, accordingly, the designing of a compact imaging lens system of high performance becomes possible.

Figure 6:
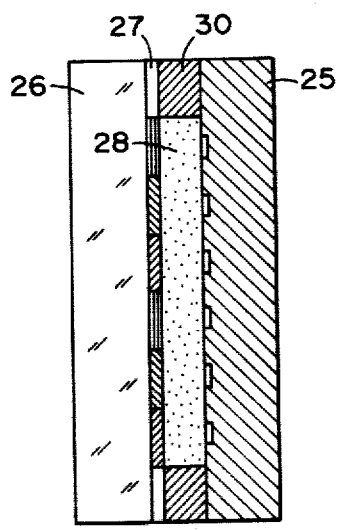
FIG. 6 shows an embodiment for maintaining a constant interval between a color filter and a photodetector.

Next, a method of controlling the thickness of the adhesive layer to a constant value to make the abovedescribed embodiment most effective will be shown. FIG. 6 shows an embodiment constructed so as to maintain constant the thickness of the adhesive layer. A color filter 27 formed on a transparent substrate 26 and a photodetector 25 are first positioned with a spacer 30 of a predetermined thickness interposed therebetween, and are then secured to each other by suitable means. Subsequently, an adhesive, or or index matching liquid 28 is poured. With such a construction, the interval between the filter 27 and the photodetector 25 is determined only by the thickness of the spacer 30 without resorting to the property of the adhesive. As a result of the adhesive 28 having been poured, even if the interval between the filter 27 and the photodetector 25 is varied near the central portion, the interval in the circumferential portion is determined by the spacer 30 and therefore, it seldom occurs that the lateral deviation amount becomes inappropriate due to a variation in the thickness of the adhesive layer.

The above embodiments have been shown with respect to a case where the exit pupil of the imaging lens system is disposed at a relatively short distance on the object side to shorten the full length of the imaging lens system. However, the device of the present invention is not restricted to such a form. For example, as a special example, there is also an imaging lens system whose exit pupil is disposed on the opposite side from the object with respect to the imaging plane. Again in this case, according to the present invention, it is possible to construct a color image detecting device which minimizes the generation of incorrect color information, by setting the color filter element arrangement interval to a great value relative to the photodetector image element area division interval.

Thus, according to the present invention, incorrect detection of color information can be eliminated by a simple construction and accordingly, there is no necessity of forming a special optical system. There can thus be provided a color image detecting device which is compact, light in weight and high in performance.

What we claim is:

1. A color image detecting device comprising:
   a photodetector having a plurality of image element areas arranged one-dimensionally or two-dimensionally;
   an imaging optical system for forming an object image on the light-receiving surface of said photodetector; and
   a color filter having a plurality of filter elements each having a spectrum transmittivity for obtaining a color signal, said filter elements being arranged correspondingly to said image element areas and set at a pitch shorter than the division interval of said image element areas.

2. A color image detecting device comprising:
   a photodetector having a plurality of image element areas arranged one-dimensionally or two-dimensionally;
   an imaging optical system for forming an object image on the light-receiving surface of said photodetector; and
   a color filter disposed between said photodetector and said imaging optical system and having a plurality of filter elements disposed correspondingly to said image element areas and each having a spectrum transmittivity for obtaining a color signal;
   said filter elements being arranged so that the principal ray incident on the central portion of any one of said image element areas passes through the central portion of one of said filter elements which corresponds to said one image element area.

3. A color image detecting device comprising:
   a photodetector having a plurality of image element areas arranged one-dimensionally or two-dimensionally;
   an imaging optical system for forming an object image on the light-receiving surface of said photodetector; and
   a color filter disposed between said photodetector and said imaging optical system and having a plurality of filter elements each having a spectrum transmittivity for obtaining a color signal, said filter elements being arranged substantially correspondingly to said image element areas, said filter elements to correspond to said image element areas being successively deviated relative to said image element areas as the angle of incidence of the light beam incident on each of said image element areas is varied by the position of each of said image element areas from the optical axis of said imaging optical system.

4. A color image detecting device according to claim 3, wherein said plurality of image element areas are arranged at an equal pitch interval, and the filter element corresponding to the image element area positioned at a distance y from said optical axis is deviated relative to said image element area by $\delta = (d \cdot y)/(n \cdot L)$, where L is the distance between the exit pupil position of said imaging optical system and said light-receiving surface, and n and d are the refractive index and thickness, respectively, of the medium between said color filter and said light-receiving surface.

5. A color image detecting device according to claim 4, satisfying the following relation:

$$1 - d/1.5 ln \leq Y \leq 1 - d/50 nl,$$

where l is the maximum width of the light-receiving surface of said photodetector, and Y is the value of the ratio of the pitch interval of said filter elements to the pitch interval of said image element areas.

* * * * *